US012700189B2

(12) United States Patent
Nakamura et al.

(10) Patent No.: US 12,700,189 B2
(45) Date of Patent: Aug. 4, 2026

(54) CONTENT DISPLAY DEVICE, CONTENT DISPLAY PROGRAM, CONTENT DISPLAY METHOD, AND CONTENT DISPLAY SYSTEM

(71) Applicant: TOSHIBA DIGITAL SOLUTIONS CORPORATION, Kawasaki (JP)

(72) Inventors: Mashuu Nakamura, Tokyo (JP); Jun Takahashi, Kawasaki (JP); Shota Saito, Tokyo (JP); Byongchol Pei, Tokyo (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 264 days.

(21) Appl. No.: 18/565,638

(22) PCT Filed: May 18, 2022

(86) PCT No.: PCT/JP2022/020692
§ 371 (c)(1),
(2) Date: Nov. 30, 2023

(87) PCT Pub. No.: WO2023/067836
PCT Pub. Date: Apr. 27, 2023

(65) Prior Publication Data
US 2024/0265647 A1 Aug. 8, 2024

(30) Foreign Application Priority Data

Oct. 18, 2021 (JP) ................................. 2021-170483
Mar. 17, 2022 (JP) ................................. 2022-042877

(51) Int. Cl.
*G06T 19/00* (2011.01)
*G06F 3/04815* (2022.01)
(Continued)

(52) U.S. Cl.
CPC ........ *G06T 19/006* (2013.01); *G06F 3/04815* (2013.01); *G06F 3/04842* (2013.01);
(Continued)

(58) Field of Classification Search
None
See application file for complete search history.

(56) References Cited

U.S. PATENT DOCUMENTS

2006/0170652 A1 8/2006 Bannai et al.
2008/0247635 A1* 10/2008 Davis ...................... G06T 19/00
382/152
(Continued)

FOREIGN PATENT DOCUMENTS

JP 2006-293605 A 10/2006
JP 2014-191718 A 10/2014
(Continued)

OTHER PUBLICATIONS

International Search Report and Written Opinion issued on Jul. 19, 2022, in corresponding International Application No. PCT/JP2022/020692, 11 pages.

*Primary Examiner* — Yi Wang
(74) *Attorney, Agent, or Firm* — Maier & Maier, PLLC

(57) ABSTRACT

According to one embodiment, provided are a parameter calculating unit 101 that calculates an initial position and an initial posture of a device as initial parameters based on a captured image of a real object with a position of the real object as an origin, a parameter updating unit 102 that calculates displacement of a position and a posture of the device and updates the position and the posture of the device starting from the initial position and the initial posture, a display processing unit 104 that overlays and displays the content on the real object, the content being disposed in a virtual space with the position of the real object as an origin, and a determination processing unit 105 that changes, when
(Continued)

a virtual object included in the displayed content is selected and operated, a determination state of the virtual object.

16 Claims, 24 Drawing Sheets

(51) Int. Cl.
  G06F 3/04842 (2022.01)
  G06T 7/73 (2017.01)
(52) U.S. Cl.
  CPC ............ G06T 7/73 (2017.01); G06T 2200/24 (2013.01); G06T 2207/30204 (2013.01)

(56) References Cited

U.S. PATENT DOCUMENTS

| | | | | |
|---|---|---|---|---|
| 2013/0314320 | A1 * | 11/2013 | Hwang | ................. G06F 3/0346 |
| | | | | 345/158 |
| 2014/0292645 | A1 | 10/2014 | Tsurumi | |

| | | | | |
|---|---|---|---|---|
| 2015/0373274 | A1 | 12/2015 | Kuwabara et al. | |
| 2018/0260032 | A1 | 9/2018 | Norieda et al. | |
| 2020/0097726 | A1 * | 3/2020 | Gurule | ................. G02B 27/017 |
| 2020/0160610 | A1 | 5/2020 | Wei et al. | |
| 2021/0029497 | A1 | 1/2021 | Hishinuma et al. | |
| 2024/0192653 | A1 * | 6/2024 | Unterguggenberger | .................... |
| | | | | G06T 17/00 |

FOREIGN PATENT DOCUMENTS

| | | | | |
|---|---|---|---|---|
| JP | 2016-006589 | A | | 1/2016 |
| JP | 2019-160290 | A | | 9/2019 |
| JP | 2019-164620 | A | | 9/2019 |
| JP | 2019153274 | A | * | 9/2019 |
| JP | 2020-057298 | A | | 4/2020 |
| JP | 2020-057299 | A | | 4/2020 |
| JP | 2020-148712 | A | | 9/2020 |
| JP | 2020-528184 | A | | 9/2020 |
| JP | 2021-018710 | A | | 2/2021 |
| WO | 2014/097413 | A1 | | 6/2014 |
| WO | 2017/057107 | A1 | | 4/2017 |

* cited by examiner

10

1

20

TOUCH PANEL

NETWORK I/F

14

15

RAM

CPU

STORAGE DEVICE

12

11

13

CAMERA

DEPTH SENSOR

| CONTENT ID | FILE NAME | FILE PATH |
|---|---|---|
| CNT1342345 | MR_CNT.fbx | C:/abc/efg/hik/ |
| ... | ... | ... |

FIG.8

| OBJECT ID | CONTENT ID | CREATOR ID | NAME | GROUP ID | DETERMINATION TARGET FLAG |
|---|---|---|---|---|---|
| sensor_32 | CNT1342345 | MK9031 | SENSOR | G14 | ON |
| ... | ... | ... | ... | ... | ... |

FIG.18

DETERMINATION TARGET NUMBER : 10

NORMAL DETERMINATION NUMBER : 4

ABNORMAL DETERMINATION NUMBER : 3

UNDETERMINED OBJECT NUMBER : 3

| No. | ID | COMMENT | ATTACHED FILE |
|-----|-----|---------|---------------|
| 1 | sensor_32 | POSITION DEVIATION | 230429.jpg |
| 2 | sensor_33 | INSTALLATION OMISSION | – |
| 3 | ... | ... | ... |

FIG.19

| OBJECT ID | CONTENT ID | USER ID | DETERMI- NATION RESULT | DETERMI- NATION DATE | COMMENT | ATTACHED FILE |
|-----------|-----------|---------|------------------------|----------------------|---------|---------------|
| sensor_32 | CNT1342345 | USR004234 | FAILED | OCT. 7, 2021 | POSITION DEVIATION | 230429. jpg |
| ... | ... | ... | ... | ... | ... | ... |

FIG.24

| OBJECT ID | CONTENT ID | CREATOR ID | NAME | GROUP ID | DETER-MINATION TARGET FLAG | VARIABLE TARGET FLAG | X-SCALE | Y-SCALE | Z-SCALE |
|---|---|---|---|---|---|---|---|---|---|
| rod_32 | CNT1342345 | MK9031 | SENSOR | G10 | ON | ON | 0 | 0 | – 24 |
| ⋮ | ⋮ | ⋮ | ⋮ | ⋮ | ⋮ | ⋮ | ⋮ | ⋮ | ⋮ |

| OBJECT ID | CONTENT ID | CREATOR ID | NAME | DETERMI-NATION TARGET FLAG | PARENT ID | GROUP ID |
|---|---|---|---|---|---|---|
| bolt_A | CNT13342345 | MK9031 | BOLT A | ON | G1 | G2 |
| : | : | : | : | : | : | : |

CONTENT DISPLAY DEVICE, CONTENT DISPLAY PROGRAM, CONTENT DISPLAY METHOD, AND CONTENT DISPLAY SYSTEM

CROSS REFERENCE TO RELATED APPLICATION

This application is based upon and claims the benefit of propriety from PCT Application No. PCT/JP2022/020692, filed May 18, 2022 the entire contents of which are incorporated herein by reference.

FIELD

Embodiments described herein relate generally to a technique for displaying content.

BACKGROUND

There are known techniques of MR (mixed reality) for overlaying a virtual world on a real world and techniques of AR (augmented reality) for adding virtual information to the real world. Attempts have been made to introduce the MR and AR techniques to working sites, which requires devices of a less general purpose, such as a head-mounted display, and thus an introduction of such techniques costs a large amount of capital investment.

BRIEF DESCRIPTION OF THE DRAWINGS

FIG. 7 is a diagram illustrating content management information according to the first embodiment.

FIG. 8 is a diagram illustrating object information according to the first embodiment.

FIG. 18 is a schematic diagram illustrating a determination result display screen according to the first embodiment.

FIG. 19 is a schematic diagram illustrating a determination result information according to the first embodiment.

FIG. 24 is a diagram illustrating object information according to the second embodiment.

FIG. 31 is a diagram illustrating object information according to the third embodiment.

DETAILED DESCRIPTION

The embodiments will be explained by reference to the accompanying drawings.

First Embodiment

Hardware Configuration

Figure 1:
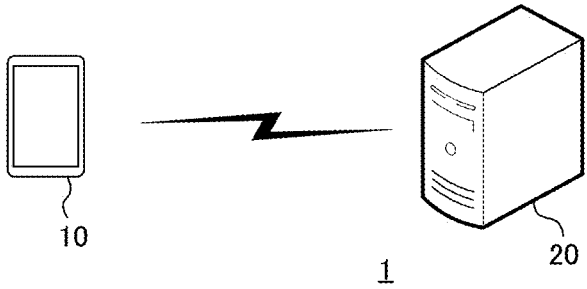
FIG. 1 is a schematic diagram illustrating a configuration of a content display system according to a first embodiment.
Figure 2:
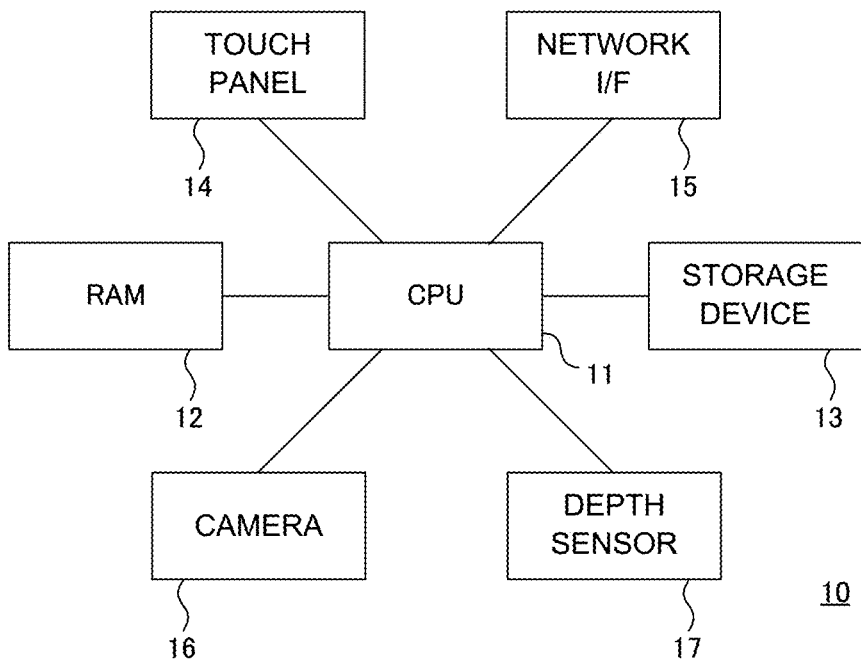
FIG. 2 is a block diagram showing a hardware configuration of a content display device according to the first embodiment.
Figure 3:
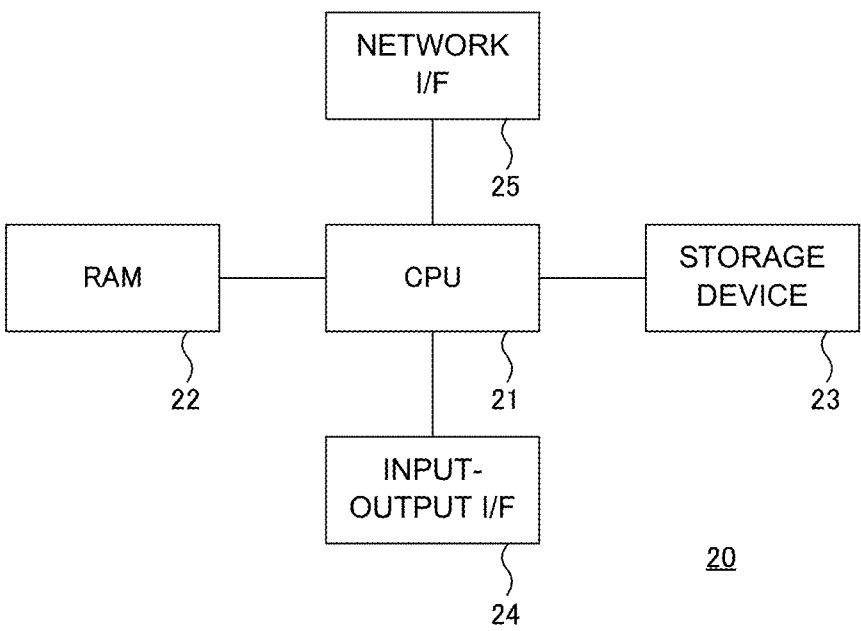
FIG. 3 is a block diagram showing a hardware configuration of a content management device according to the first embodiment.

The hardware configuration of the content display system according to the first embodiment will be discussed. FIG. 1 is a schematic diagram illustrating the configuration of the content display system according to the present embodiment. FIGS. 2 and 3 are diagrams respectively illustrating the hardware configurations of the content display device and the content management device.

As shown in FIG. 1, a content display system 1 according to the present embodiment includes a content display device 10 and a content management device 20. In the present embodiment, the content display device 10 is a terminal device used by a user who browses content related to a real object, and is configured as a portable terminal device, specifically, a tablet terminal device. The content management device 20 manages content browsed using the content display device 10, and is configured as a personal computer (PC) in the present embodiment. The content display device 10 may be a smartphone or a head-mounted display, or, when a determination function described later is not used, may be configured as a device capable of display on a display or projection by a projector. The content management device 20 may be replaced by a local environment or a cloud environment.

A real object is a target freely operated by a user, and is attached with a marker to be described later in detail. Examples of such a real object include a device that requires inspection of each part and a device for which colors of respective parts are to be determined. In the present embodiment, assume that the real object is a device that requires inspection of each part. The content display device 10 is connected to a network via a wireless LAN (Local Area Network) installed in a worksite where the real object is placed, and communicates with the content management device 20 via the network. The content display device 10 may also communicate with the content management device 20 via a wired connection using a USB (Universal Serial Bus) cable, for example.

As shown in FIG. 2, the content display device 10 includes, as hardware, a CPU (Central Processing Unit) 11, a RAM (Random Access Memory) 12, a storage device 13, a touch panel 14, a network I/F (Interface)15, a camera 16, and a depth sensor 17. The CPU 11 and the RAM 12 cooperate to execute various functions, and the storage device 13 stores various types of data used for processing executed by each function. The touch panel 14 is an input-output device including a display and a touch sensor, and is provided on the front side of the content display device 10. The network I/F 15 wirelessly communicates with the content management device 20. The content management device 20 may communicate with the content management device 10 via a wired connection using a USB (Universal Serial Bus) cable, for example.

The camera 16 is an imaging device that is provided on the back side of the content display device 10 and captures a two-dimensional image and a video by visible light. The depth sensor 17 is provided on the back side of the content display device 10, and projects a laser beam and receives the reflected light by a light receiving element, thereby measuring a distance from the content display device 10 to a surrounding object. In the present embodiment, the depth sensor 17 measures a distance from the content display device 10 to a surrounding object using a ToF (Time of Flight) method of converting a delay time of a light receiving pulse with respect to a light projecting pulse into a distance, and forms a three-dimensional point group. In this regard, assume that the imaging direction of the camera 16 and the measurement direction of the depth sensor 17 coincide with each other.

As shown in FIG. 3, the content management device 20 includes, as hardware, a CPU 21, a RAM 22, a storage device 23, an input-output I/F 24, and a network I/F 25. The CPU 21 and the RAM 22 cooperate to execute various functions, and the storage device 23 stores various types of data used for processing executed by each function. The input-output I/F 24 inputs and outputs data to and from an input device, such as a keyboard, and an output device, such as a display, connected to the content management device 20. The network I/F 25 performs wired and wireless communication with other devices including the content display device 10.

Functional Configuration

Figure 4:
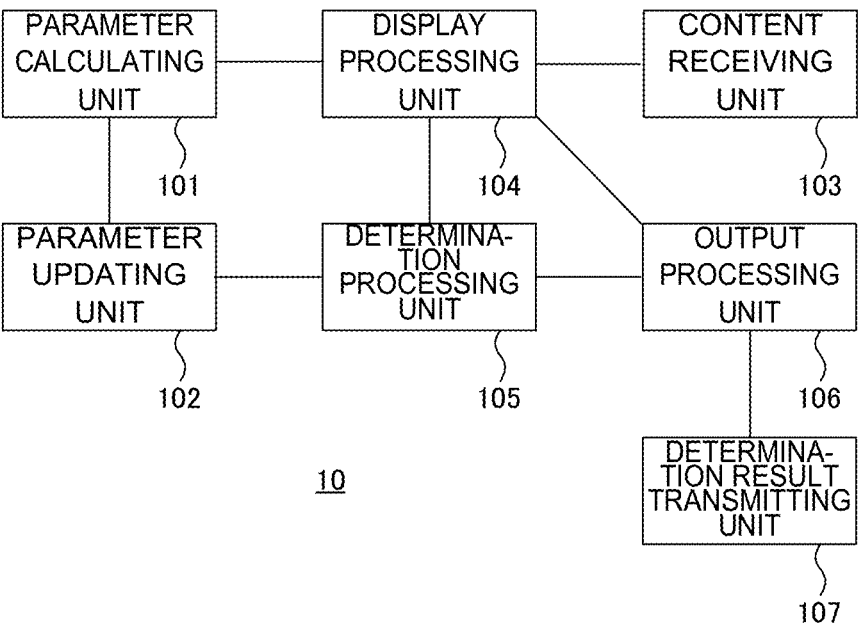
FIG. 4 is a block diagram showing a functional configuration of the content display device according to the first embodiment.
Figure 5:
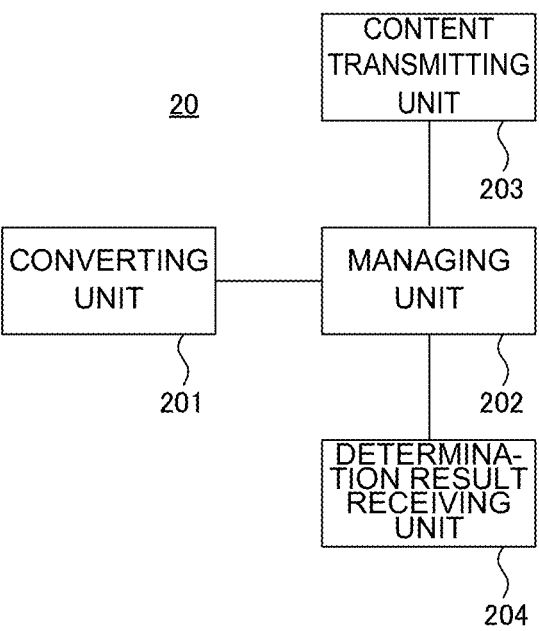
FIG. 5 is a block diagram showing a functional configuration of the content management device according to the first embodiment.

The functional configuration of the content display device and the content management device will be discussed. FIGS. 4 and 5 are block diagrams respectively showing the functional configurations of the content display device and the content management device according to the present embodiment.

As shown in FIG. 4, the content display device 10 functionally includes a parameter calculating unit 101, a parameter updating unit 102, a content receiving unit 103, a display processing unit 104, a determination processing unit 105, an output processing unit 106, and a determination result transmitting unit 107.

The parameter calculating unit 101 recognizes a marker in a captured image in which a real object is captured by the camera 16, and calculates, as a parameter, an initial position and an initial posture of the content display device 10 in marker coordinates with the marker as an origin based on the recognized marker. The parameter updating unit 102 calculates displacement of the position and the posture of the content display device 10 for each frame based on the displacement between the previous and subsequent frames of the three-dimensional point group acquired by the depth sensor 17, and, based on the calculated displacement, updates the position and the posture of the content display device 10 starting from the initial position and the initial posture calculated by the parameter calculating unit 101.

The content receiving unit 103 receives content transmitted from the content management device 20. The display processing unit 104 displays the content received by the content receiving unit 103 on the touch panel 14 based on the position and posture of the content display device 10. The determination processing unit 105 performs determination processing of the content based on the selection operation of the user on the touch panel 14. The output processing unit 106 outputs determination result information indicating a determination processing result of the determination processing unit 105. The determination result transmitting unit 107 transmits the determination result information, which is output from the determination processing unit 105, to the content management device 20.

As shown in FIG. 5, the content management device 20 functionally includes a converting unit 201, a managing unit 202, a content transmitting unit 203, and a determination result receiving unit 204. The converting unit 201 converts three-dimensional data related to a real object into content. The three-dimensional data to be converted into the content includes CAD (Computer Aided Design) data, which is design information of the real object. The managing unit 202 manages the content converted by the converting unit 201. The content transmitting unit 203 transmits the content managed by the managing unit 202 to the content display device 10. The determination result receiving unit 204 receives the determination result information transmitted from the content display device 10.

Content Generation Processing

Figure 6:
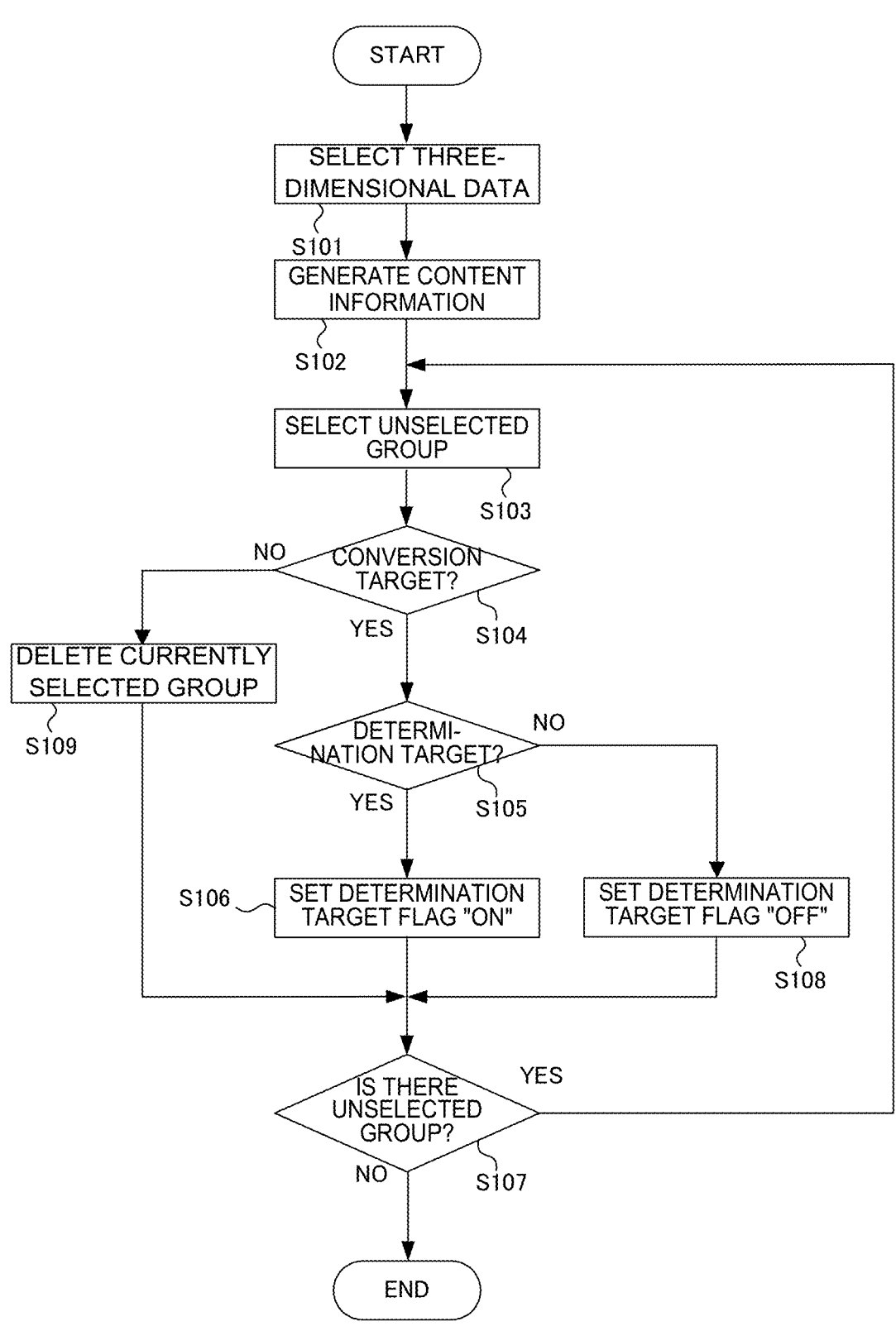
FIG. 6 is a flow chart showing content generation processing according to the first embodiment.

The content generation processing will be discussed. FIG. 6 is a flowchart showing the content generation processing. FIGS. 7 and 8 are diagrams respectively showing content management information and object information. In FIG. 6, assume that three-dimensional data associated with a real object is already entered in the content management device.

As shown in FIG. 6, the converting unit 201 selects three-dimensional data to be converted among from three-dimensional data entered in the content management device 20 (S101).

The three-dimensional data to be converted into content will be discussed. The three-dimensional data to be converted is design data of a device to be inspected as a real object, for example. The three-dimensional data includes at least one virtual object in which each part of the device is represented as a three-dimensional model. When the three-dimensional data includes a plurality of virtual objects, the virtual objects are classified by the creator of the three-dimensional data according to criteria, such as arrangement positions and types of parts, and grouped by classification.

Prior to the content generation processing, at least some of the groups included in the three-dimensional data are set as a conversion target, which is a virtual object to be converted into content, and at least some of the groups to be converted are set as a determination target, which is a virtual object to be subjected to the determination processing.

After selecting the three-dimensional data, the converting unit 201 generates a content ID, which is an identifier uniquely indicating content, for the selected three-dimensional data. As shown in FIG. 7, the converting unit 201 generates content information in which the content ID, a file name of the three-dimensional data, and a file path of the three-dimensional data are associated with each other (S102).

Next, the converting unit 201 selects an unselected group in the selected three-dimensional data (S103), and determines whether the selected group is set as the conversion target (S104).

In a case where the selected group is a conversion target (S104, YES), the converting unit 201 determines whether the selected group is set as a determination target (S105).

When the selected group is the determination target (S105, YES), the converting unit 201 generates object information including an object ID, which is an identifier uniquely indicating each of virtual objects included in the selected group, and sets a determination target flag in the object information to "ON" (S106).

As shown in FIG. 8, the object information includes an object ID, a content ID, a creator ID, a name, a group ID, and a determination target flag in association with one another. The content ID indicates content to which the corresponding virtual object belongs. The creator ID is an identifier that uniquely indicates the creator of the content. The name indicates a name assigned to the corresponding virtual object by the creator. The group ID is an identifier that uniquely indicates a group to which the corresponding virtual object belongs. The determination target flag indicates whether the corresponding virtual object is a determination target, and is set to "ON" when it is determined to be a determination target, and is set to "OFF" when it is determined not to be a determination target. The converting unit 201 may set the determination target flags of all the virtual objects included in the group to "ON", and then change the setting flag of the virtual object selected by the user to "OFF."

After the operation of S106, the converting unit 201 determines whether there is an unselected group in the currently selected three-dimensional data (S107).

If there is no unselected group (S107, NO), the converting unit 201 ends the content generation processing for the entered three-dimensional data. On the other hand, if there is an unselected group (S107, YES), the converting unit 201 again selects an unselected group in the currently selected three-dimensional data (S103).

In S105, if the currently selected group is not a determination target (S105, NO), the converting unit 201 generates object information including an object ID, which is an identifier uniquely indicating a virtual object, for each of the virtual objects included in the currently selected group, and sets the determination target flag in the object information to "OFF" (S108). After the operation of S108, the converting unit 201 determines whether there is an unselected group in the currently selected three-dimensional data (S107).

In S104, if the currently selected group is not a conversion target (S104, NO), the converting unit 201 deletes the virtual object belonging to the currently selected group among the currently selected three-dimensional data (S109). After the operation of S109, the converting unit 201 determines whether there is an unselected group in the currently selected three-dimensional data (S107).

As described above, the content generation processing deletes the virtual object that is unnecessary for the content in the entered three-dimensional data and sets some of the virtual objects as a determination target, thereby generating the content. The content includes the three-dimensional data in which the unnecessary virtual object is deleted, the content information in which the content ID is attached to the three-dimensional data, and the object information in which an object ID is attached to each of the virtual objects included in the three-dimensional data. The three-dimensional data, the content information, and the object information are all managed by the managing unit 202.

Operation of Content Display Device

Figure 9:
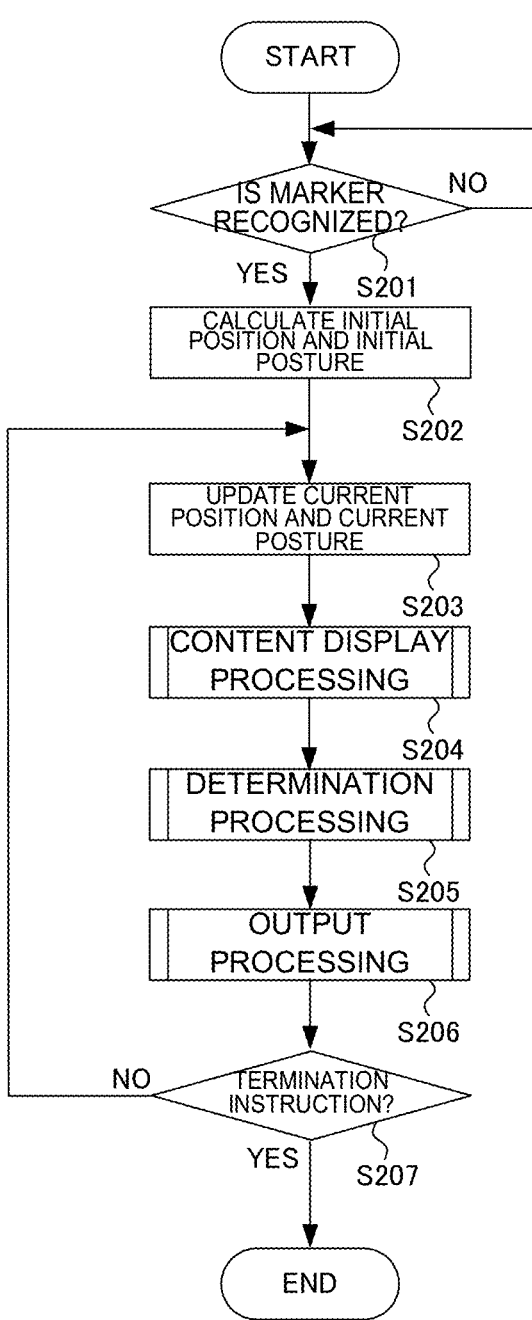
FIG. 9 is a flow chart showing an operation of the content display device according to the first embodiment.
Figure 10:
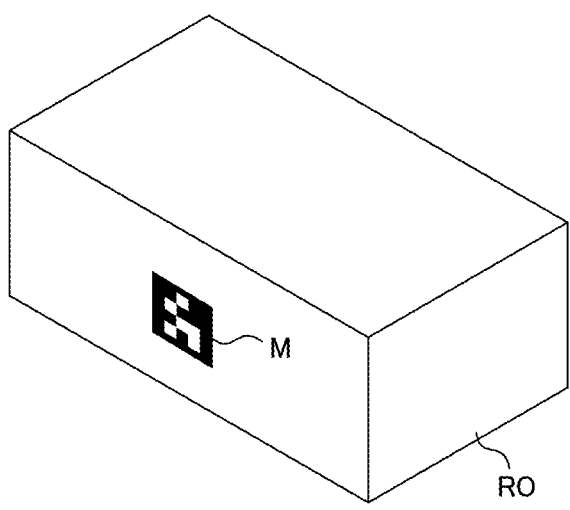
FIG. 10 is a schematic diagram illustrating a real object according to the first embodiment.
Figure 11:
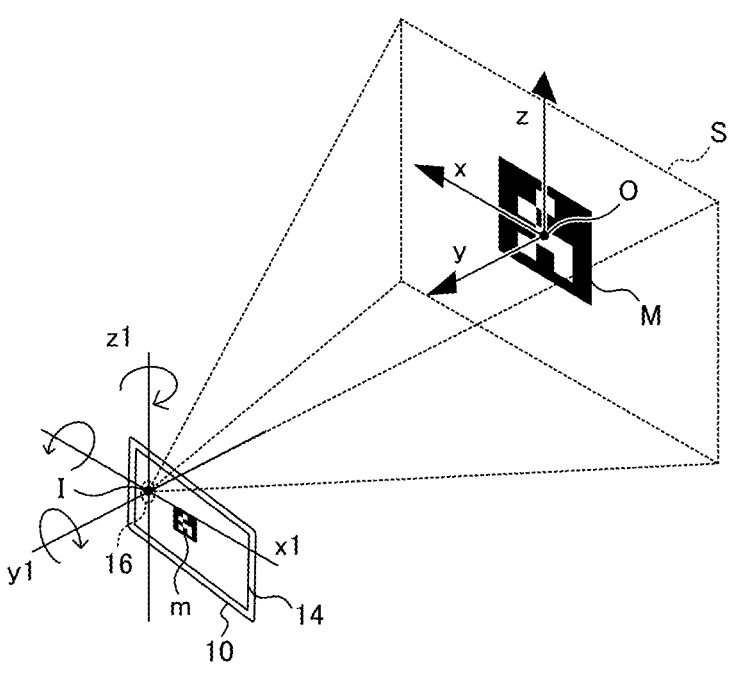
FIG. 11 is a schematic diagram illustrating calculation of an initial position and an initial posture according to the first embodiment.

The operation of the content display device will be discussed. FIG. 9 is a flow chart showing an operation of the content display device. FIG. 10 is a schematic diagram illustrating a real object. FIG. 11 is a schematic diagram describing calculation of an initial position and an initial posture. Prior to the operation shown in FIG. 9, assume that the content related to the real object is transmitted to the content display device from the content management device.

As shown in FIG. 9, the parameter calculating unit 101 determines whether a marker M is recognized in the image captured by the camera 16 (S201).

As shown in FIG. 10, the marker M is a two-dimensional image attached to a real object RO, and defines the origin of the virtual space, in which the content is arranged, in the real space. Examples of such a marker M include a two-dimensional image attached to the real object RO and unevenness embossed like a two-dimensional image on the real object. The marker M may not necessarily be attached to the real object RO, and may be attached to a floor surface, a wall surface, or a ceiling surface around the real object RO.

The origin of the virtual space may be determined in the real space by a three-point positioning method or a position fixing method instead of using the marker M. The three-point positioning method selects shapes of at least three points in the real object and uses a surface connecting the selected points instead of the marker M. The position fixing method previously fixes the position to place the real object and the position to use the content display system 1, specifically, the initial position of the content display device 10, and always uses the content display system 1 at such a position, thereby determining the origin of the virtual space in the real space. As described, any method may be used to define the origin of the virtual space in the real space.

If the marker M is not recognized (S201, NO), the parameter calculating unit 101 again determines whether the marker M is recognized in the image captured by the camera 16 (S201). On the other hand, if the marker M is recognized (S201, YES), the parameter calculating unit 101 calculates, as parameters, the initial position and the initial posture of the content display device 10 with the marker M as the origin (S202).

The calculation of the initial position and the initial posture will be described. As shown in FIG. 11, when the camera 16 captures an imaging range S including the marker M attached to the real object RO, a marker M on the captured image is scaled or deformed depending on the positional relation between the marker M and the content display device 10. The parameter calculating unit 101 calculates the relative position and the relative posture of the content display device 10 to the marker M according to the size and the shape of the marker m based on the marker information indicating the shape and the size of the marker M as a reference. Further, the parameter calculating unit 101 calculates the position of the content display device 10 on three axes (x, y, z in FIG. 11) with the marker M as the origin and the rotation of the content display device 10 around rotation axes (x1, y1, z1) parallel to these three axes based on the relative position and the relative posture, thereby calculating the initial position and the initial posture of the content display device 10. In the present embodiment, the center point of the marker M is the origin O, and the center of the camera 16, specifically, the center point of the image sensor is the origin I of the rotation axis.

After calculating the parameters, the parameter updating unit 102 updates the current position and the current posture of the content display device 10 based on the displacement of the three-dimensional feature point group detected by the depth sensor 17 (S203).

The updating of the current position and the current posture will be discussed. The parameter updating unit 102 calculates displacement of the position and the posture of the content display device 10 based on the displacement of the three-dimensional feature point groups consecutive in time series and integrates the calculated displacement into the initial position and the initial posture or the position and the posture updated last time, thereby sequentially updating the current position and the current posture of the content display device 10. Assume that known methods such as SLAM (Simultaneous Localization and Mapping) and SfM (Structure from Motion) methods are used to calculate the displacement of the position and the posture based on the displacement of the three-dimensional feature point group. Further, the displacement of the position and the posture of the content display device 10 may be calculated using VSLAM (Visual SLAM) based on the image captured by the camera 16.

After the current position and the current posture are updated, content display processing is executed (S204), determination processing is executed (S205), and output processing is executed (S206). The content display processing, the determination processing, and the output processing will be described later.

After the output processing is executed, the display processing unit 104 determines whether a termination instruction for terminating the display of the content has been issued by the user via the touch panel 14 (S207). If the termination instruction is issued (S207, YES), the content display device 10 terminates the operation. On the other hand, if the termination instruction is not issued (S207, NO), the parameter updating unit 102 updates the current position and the current posture of the content display device 10 again based on the displacement of the three-dimensional feature point group detected by the depth sensor 17 (S203).

Figure 12:
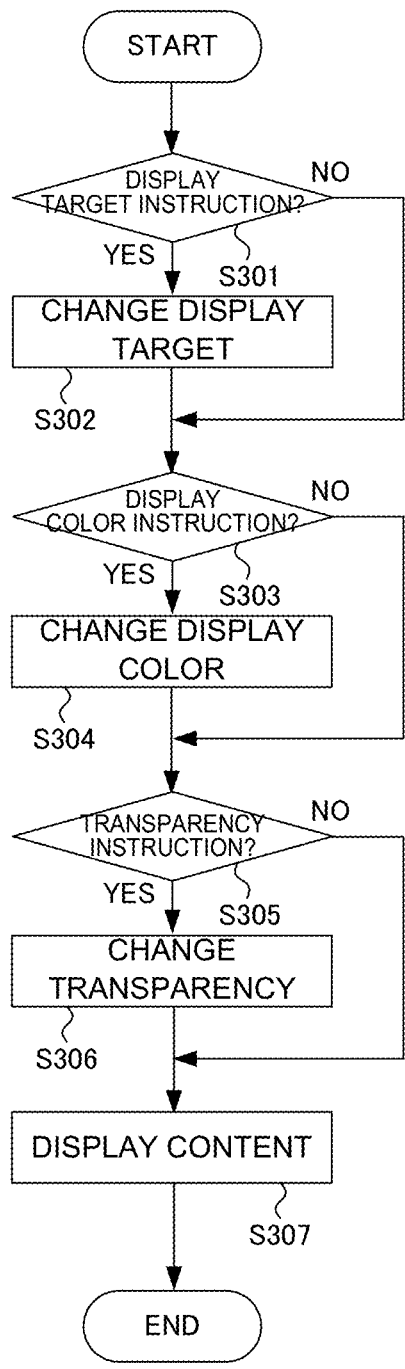
FIG. 12 is a flow chart showing content display processing according to the first embodiment.
Figure 13:
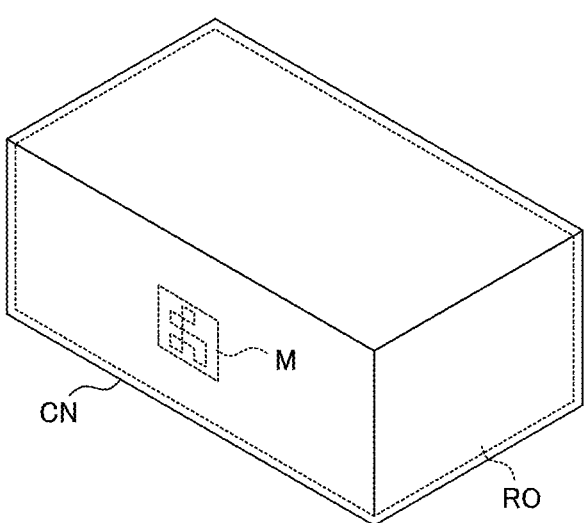
FIG. 13 is a schematic diagram illustrating content overlaid on a real object according to the first embodiment.
Figure 14:
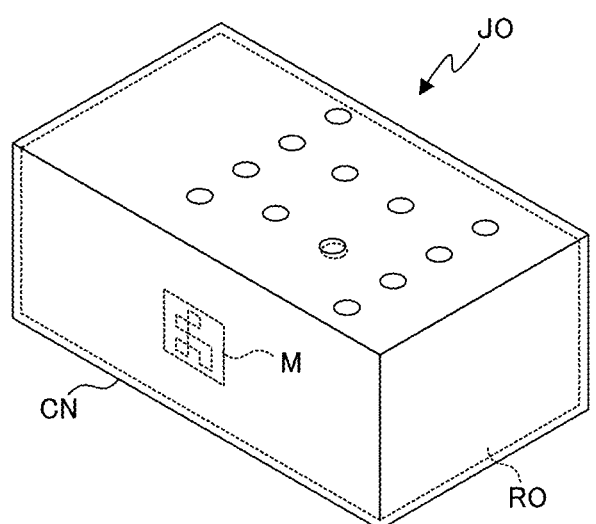
FIG. 14 is a schematic diagram illustrating a virtual object to be determined according to the first embodiment.

As described above, the content display device 10 can determine the origin O of the virtual space based on a part of the real object RO. The parameter calculating unit 101 may calculate the initial position and the initial posture in accordance with an instruction from the user via the touch panel 14 at predetermined intervals or at every time the camera 16 captures the marker M. The content display device 10 configured as described above can reduce the deviation of the content with respect to the real object RO.
Content Display Processing The content display processing will be described. FIG. 12 is a flow chart showing the content display processing. FIG. 13 is a schematic diagram illustrating content overlaid on a real object. FIG. 14 is a schematic diagram illustrating a virtual object to be determined. In the content display processing shown in FIG. 12, assume that the content related to the real object is selected by the user in advance.

As shown in FIG. 12, the display processing unit 104 determines whether a display target instruction for selecting a group to be displayed is issued by the user (S301).

If the display target instruction is issued (S301, YES), the display processing unit 104 changes the display target so as to display the group selected by the user on the touch panel 14 (S302).

After the display target is changed or if the display target instruction is not issued (S301, NO), the display processing unit 104 determines whether a display color instruction for changing the display color of the selected group is issued by the user (S303).

If the display color instruction is issued (S303, YES), the display processing unit 104 changes the display color of the virtual object belonging to the selected group to the designated color (S304).

After the display color is changed or if the display color instruction is not issued (S303, NO), the display processing unit 104 determines whether a transparency instruction for changing the transparency of the selected group is issued by the user (S305).

If the transparency instruction is issued (S305, YES), the display processing unit 104 changes the virtual object belonging to the selected group to the designated transparency (S306).

After the transparency is changed or if the transparency instruction is not issued (S305, NO), the display processing unit 104 displays, on the touch panel 14, the virtual object of the group designated as the display target among the content arranged with respect to the origin O in the marker M in the designated display color and transparency (S307), and the display processing is terminated.

In the present embodiment, as shown in FIG. 13, assume that the position of the content relative to the origin O in the virtual space is determined in advance such that the content is displayed in substantially the same posture and size as the real object on the touch panel 14. Further, if the group designated as the display target includes a virtual object as the determination target, as shown in FIG. 14, the determination object JO, which is a virtual object set as the determination target, is displayed in a different color from the other virtual objects so as to be easily visually recognizable by the user.

Figure 15:
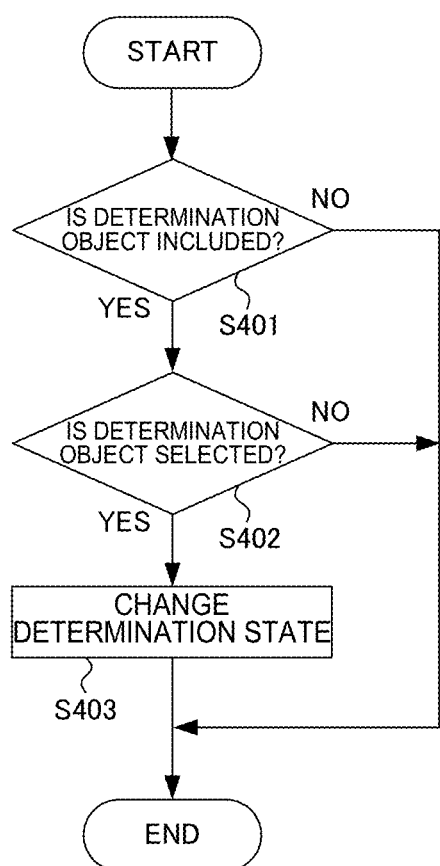
FIG. 15 is a flow chart showing determination processing according to the first embodiment.
Figure 16:
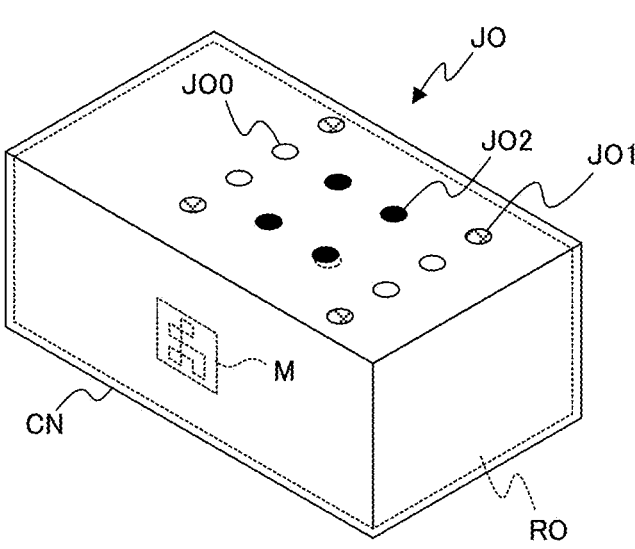
FIG. 16 is a schematic diagram illustrating the determined virtual object according to the first embodiment.

Further, assume that the content is switched between the MR (Mixed Reality) display, in which the content is overlaid on the image captured by the camera 16, and the AR (Augmented Reality) display, in which only the content is displayed, according to the setting made by the user.
Determination Processing The determination processing will be discussed. FIG. 15 is a flowchart showing the determination processing. FIG. 16 is a schematic diagram illustrating the determined virtual object.

As shown in FIG. 15, the determination processing unit 105 determines whether a group displayed on the touch panel 14, more specifically, a group designated as a display target in the content display processing described above, includes a determination object (S401).

If the determination object is included in the displayed group (S401, YES), the determination processing unit 105 determines whether the determination object has been selected by the user (S402). The determination processing unit 105 determines that the determination object is selected when a tap operation is performed on the touch panel 14.

When the determination object is selected (S402, YES), the determination processing unit 105 changes the determination state of the selected determination object (S403), and the determination processing is terminated.

The determination state will be described. As shown in FIG. 16, the determination object JO is changed to a plurality of different selection states (JO1, JO2) in accordance with a selection operation of the user. In the present embodiment, the determination object is determined to be either "normal" or "abnormal." FIG. 16 shows an undetermined determination object JO0, a determination object JO1 that is determined as "normal", and a determination object JO2 that is determined as "abnormal." The display processing unit 104 displays the determination objects JO0, JO1, and JO2 in different display colors on the touch panel 14. This enables the user to easily recognize the determination states of the determination objects. The determination states other than "normal" and "abnormal" include, for example, "unknown" and "temporary hold." If the determination state is "abnormal", as will be described later, the abnormal state can be separately recorded as character string information or still image information. This enables the user to register the result of the determination and complete the report work to the supervisor, as an example of use to be described later.

The determination state of the determination object JO is changed by the number of selection operations on the determination object JO, that is, the number of tap operations on the determination object JO in this embodiment. Specifically, when the number of tap operations is 0, the determination state is not determined, when the number of tap operations is 1, the determination state is "normal", and when the number of tap operations is 2, the determination state is "abnormal." When a tap operation is further performed on the determination object in the "abnormal" determination state, the determination object is set to an undetermined state. When the determination states include "normal", "abnormal", "unknown", and "temporary hold", the determination state is an undetermined state when the number of tap operations is 0, a "normal" determination state when the number of tap operations is 1, an "abnormal" determination state when the number of tap operations is 2, a "unknown" determination state when the number of tap operations is 3, a "temporary hold" determination state when the number of tap operations is 4, and an undetermined state when further tap operations are performed. If the determination state is "abnormal", as will be described later, the abnormal state can be separately recorded as character string information or still image information. This enables the user to register the result of the determination and complete the report work to the supervisor, as an example of use to be described later. The determination state of the determination object JO may be changed by an operation on a determination state changing screen including options, such as "normal", "abnormal", "unknown", and "temporary hold". The determination state changing screen is overlaid on the main screen and displayed when the determination object JO as a target for changing the determination state is tapped once. When the determination state is changed to "abnormal", as will be described later, the user can separately record the abnormal state as character string information or still image information on the determination state changing screen. In a case where "normal" is selected, or "abnormal" is selected and the character string information is added, and then the save button or the cancel button is pressed, the changed determination state is saved and then the determination state changing screen is closed.

There may be at least one or more determination states of the determination object JO, and the user can set the labels for the plurality of determination states. This enables the content display device 10 to be used in various applications.

If the determination object is not included in the objects displayed in S401 (S401, NO) or if the determination object is not selected (S402, NO), the determination processing is terminated.

Output Processing

Figure 17:
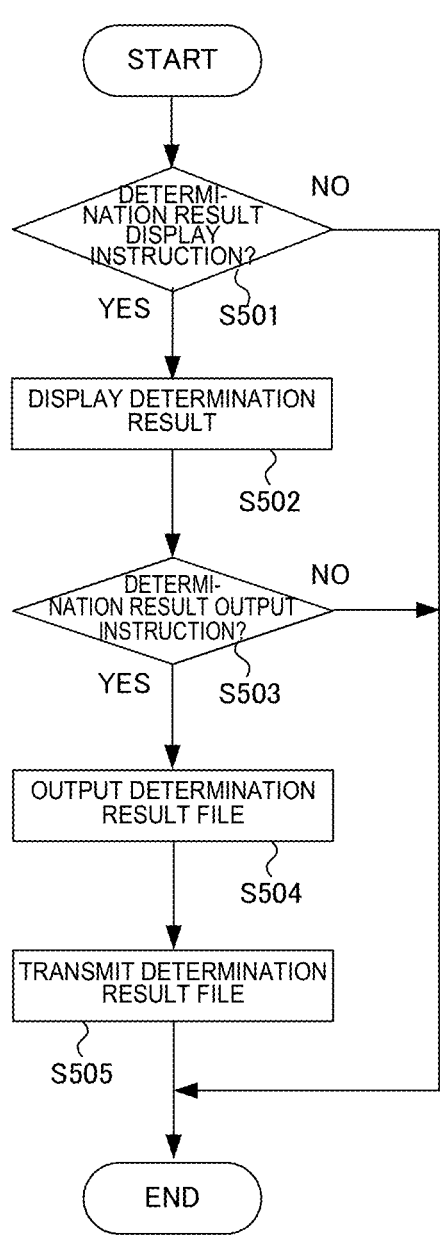
FIG. 17 is a flow chart showing output processing according to the first embodiment.

The output processing will be discussed. FIG. 17 is a flow chart showing the output processing. FIG. 18 is a schematic diagram illustrating a determination result display screen. FIG. 19 is a diagram illustrating determination result information.

As shown in FIG. 17, the display processing unit 104 determines whether a user has issued a determination result display instruction (S501).

If the determination result display instruction is issued (S501, YES), the display processing unit 104 displays the determination result of the determination object on the touch panel 14 (S502). The determination result is displayed on the determination result display screen.

As shown in FIG. 18, the determination result display screen includes a determination target number, a normal determination number, an abnormal determination number, an undetermined object number, and an abnormal determination list. The determination target number indicates the total number of determination objects included in the content. The normal determination number indicates the total number of determination objects that are determined as "normal." The abnormal determination number indicates the total number of determination objects that are determined as "abnormal." The undetermined object number indicates the total number of objects that are not determined among all the determination objects. The determination result display screen enables the user to check whether there is a check omission, thereby improving the quality and productivity of the determination task.

The abnormal determination list indicates a list of the determination objects each determined as "abnormal." The records of the abnormal determination list include the fields of an object ID, a comment, and an attached file. The comment is text entered by the user regarding the determination object indicated by the corresponding object ID in the determination result display screen. The attached file indicates a file name attached by the user regarding the determination object indicated by the corresponding object ID in the determination result display screen. The attached files may include media files such as an image file, a moving image file, and an audio file related to the corresponding determination object, but any file may be attached.

After displaying the determination result, the output processing unit 106 determines whether a determination result output instruction has been issued by the user (S503).

If the determination result output instruction is issued (S503, YES), the output processing unit 106 outputs the determination result information (S504), and the determination result transmitting unit 107 transmits the output determination result information to the content management device 20 (S505). The output processing is then terminated. The determination result information is managed by the managing unit 202 in the content management device 20.

The determination result information is a file including the abnormal determination list and associating, as shown in FIG. 19, an object ID indicating the determination object that is determined as "abnormal", a content ID indicating the content to which the determination object belongs, a user ID indicating the user of the content display device 10, a determination result of the determination object, a determination date and time indicating the date and time when the determination is made, a comment, and an attached file with one another. The determination result information is output as a file indicating a data structure of an XML (extensible Markup Language) file, a JSON (JavaScript (registered trademark) Object Notation) file, and a CSV (Comma-Separated Values) file, for example. The determination result information is transmitted together with the attached file indicated in the determination result information.

If the determination result display instruction is not issued (S501, NO) or if the determination result output instruction is not issued (S503, NO), the output processing is terminated.

The determination result is displayed in a list, and thus the user can easily recognize the determination result of the real object. Further, the determination result is output as a file, and thus the determination result of the real object can be easily shared in the organization.

Figure 20:
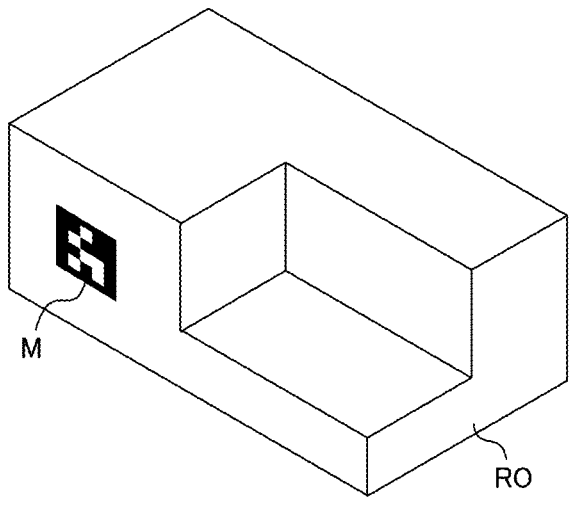
FIG. 20 is a schematic diagram illustrating a real object according to the first embodiment.
Figure 21:
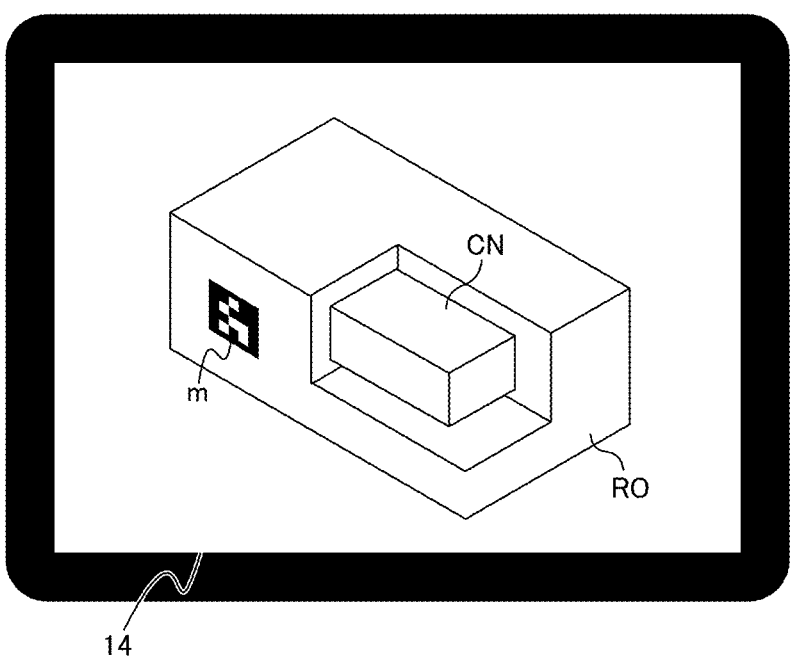
FIG. 21 is a diagram illustrating the content display device that displays content overlaid on a real object according to the first embodiment.

In the embodiment described above, the content display device 10 displays the content CN overlaid on the real object RO. In this regard, as shown in FIG. 21, the content display device 10 may display the content CN disposed in the partially missing real object RO as shown in FIG. 20. That is, the content display device 10 may dispose the content CN at a position that is not overlaid on the real object RO in the virtual space.

Figure 22:
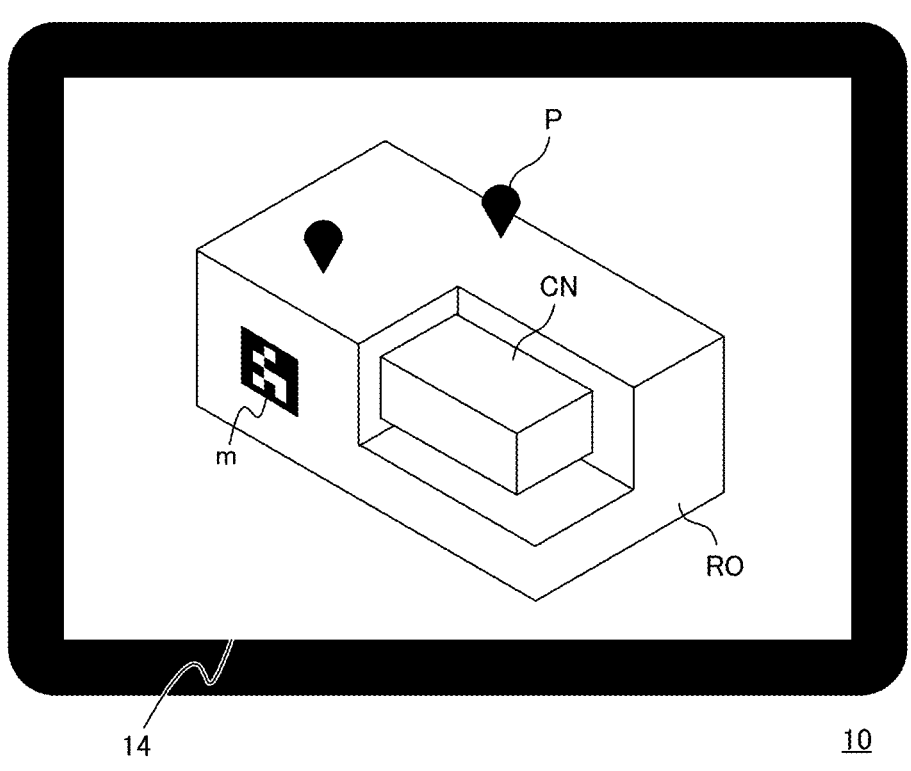
FIG. 22 is a diagram illustrating the content display device that displays pin object according to the first embodiment.

As shown in FIG. 22, the content display device 10 may display a pin object P, which is formed in a pin shape indicating a predetermined position, to be overlaid on the real object RO. The pin object P is a virtual object indicating a predetermined location in the virtual space. The user selects the predetermined location in the virtual space via the touch panel 14, thereby registering a new pin object P. The user can associate a new pin object P with additional information, which can include text and an image, and modify the additional information associated with the existing pin object P. The display processing unit 104 displays the pin object P on the touch panel 14, and, when the pin object P is selected, displays the additional information associated with the selected pin object P on the touch panel 14.

First Use Example

The first use example will be discussed. In the first use example, the content display system is used to check a position of a welding point.

Conventionally, the welding point is positioned by attaching actual size paper or a template having a hole at the welding point position to a welding target. The operator who checks the position performs quality inspection, such as whether a hitting point position is correct, the size of the hitting point is correct, and the depth of the hitting point (whether the required number of metal plates are welded) is correct. In this regard, it is up to the operator to ensure that all welding points are verified. After the verifying operation, the operator enters the result in a computer, for example, to report to the supervisor.

When the content display system 1 is used to check the position of the welding point, the operator can check the position of the welding point using the content created in accordance with the welding target. This eliminates the need of preparing a template in advance, for example. Further, the determination processing is performed for each determination object indicating a welding point, and thus it is possible to thoroughly check the welding points. The determination result is accumulated as data, and this helps easier report to the supervisor and facilitates using the determination result for analyzing the locations and patterns where welding defects often occur and improving the activities related to welding operation.

Second Use Example

The second use example will be discussed. In the second use example, the content display system is used for verifying operation after coating.

Conventionally, when a coating material is applied to a coating target, a verifying operation is performed. The verifying operation is performed to verify whether a coating type, a coating position, and a coating range of the coating material are correct. In checking the coating range, the operator checks whether the coating is applied to the necessary range and the coating is inside the coating range. In this regard, it is up to the operator to ensure that all coating areas are verified. After the verifying operation, the operator enters the result in a computer, for example, to report to the supervisor.

When the content display system 1 is used for the verifying operation after the coating, preparation such as a checklist for verification is unnecessary, and the type of coating material, the coating position, and the coating size can be checked using the content created in accordance with the coating operation. The determination processing is performed for each determination object indicating a coating position, and thus it is possible to thoroughly perform the verifying operation. The determination result is accumulated as data, and this helps easier report to the supervisor and facilitates using the determination result for analyzing the locations and patterns where coating defects often occur and improving the activities related to coating operation.

Third Use Example

The third use example will be discussed. In the third use example, the content display system is used for an assembly verification of a mold and a press machine.

Conventionally, in the assembly verification of a mold and a press machine, an actual size seat or a template is prepared in advance on the upside down press mold for each mold and press machine in which the mold is installed, and the sheet or the template is attached to the mold. The operator checks whether a cushion pin or a protective member to protect the cushion pin does not interfere with a base portion (well girder shape) of the press mold. In a case where the cushion pin or the protective member interferes with the base portion due to the difference in shapes between the press machines, the operator cuts the base portion of the mold as necessary to eliminate the interference, for example. Typically, the verification operation and the interference prevention operation are performed by different operators, and the operator of the verification transmits the verification operation result to the operator of the prevention operation orally or in documents, for example. As such, who did what operation, when, which part, is recorded on paper, or not recorded al all.

When the content display system 1 is used for the assembly verification of the mold and the press machine, preparation such as a template is unnecessary, and it is possible to check the position of the cushion pin as a virtual object. The determination processing is performed for each cushion pin as a determination object, and thus the operator can thoroughly perform the verification. Alternatively, the determination result can be accumulated as data, which can be analyzed afterward to identify locations and patterns where the interference often occurs and to improve the operations.

Even if the operators are different between the verification operation and the interference prevention operation, the determination result is output as data, which can be used to communicate what kind of operation is required to which part, and to record who, when, what kind of operation is performed after the operation. The determination result and the transmitted record can be accumulated as data, which can be analyzed afterward to identify locations and patterns where the interference often occurs and to improve the operations.

Fourth Use Example

The fourth use example will be discussed. In the fourth use example, the content display system is used for maintenance of a mold.

Conventionally, in the regular maintenance operation of a mold, an operator removes the mold from a machine and visually checks the locations where repairs, such as welding, cutting, spring replacement, and cushion replacement, are to be made. Further, the repair operator repairs the mold based on the communication from the verifying operator in spoken words, or by text or photographs, for example. However, because of a time difference between the time of verification and repair, the details of the repair tend to be ambiguous and there is waste in confirming the location and details of the repair.

When the content display system 1 is used for the maintenance operation of the mold, the verifying operator can use the determination object with various media files to clearly indicate what to do and how to do to at which location of the mold. Further, the repair operator can clearly understand what to do at which location, and can perform the repair operation without time lag.

Further, it is possible to record who has repaired, when, and which part, and thus, the data can include the verifying result, the transmitted information, and the repair operation. With the use of accumulated data, it is possible to analyze the locations and patterns where the defect often occurs and to improve the operations. Further, such analysis results are fed back to the design department and the development department, thereby serving to reduce the number of defects and design a devise that is easier to repair. The analysis result can also be used to adjust the schedule of periodic maintenance as preventive maintenance, and to reduce irregular maintenance as post maintenance.

Fifth Use Example

The fifth use example will be discussed. In the fifth use example, the content display system is used for designating a coating range in coating.

Conventionally, a special instrument including a cover made of plastic or metal is provided in order to indicate which coating material is to be applied at which position, and masking tape is attached around such a position. The design is changed many times in the prototyping stage, and the special instrument thus needs to be created again in accordance with a design change. It takes time to create the special instrument, and thus a time lag occurs between the design change and the masking operation.

The content display system 1 is used for designating the coating range and overlaying the content, which is based on the design data of the coating target, on the coating target. This serves to clarify the coating position and the coating range and attach the masking tape without a special instrument. Further, time and cost to create the special instrument can be reduced.

Sixth Use Example

The sixth example of use will be discussed. In the sixth use example, the content display system is used for the layout plan of the machine equipment.

Conventionally, when mechanical equipment is newly installed or replaced, it is determined whether the mechanical equipment can be installed in a factory building based on design drawings. In this case, the interference to the building and other the mechanical equipment that may occur when the mechanical equipment operates and the lines of flow of operators and material carriers in the building are not adequately considered, and thus the layout of the mechanical equipment needs to be reviewed.

When the content display system 1 is used for the layout plan of the mechanical equipment, virtual mechanical equipment to be newly installed can be placed in the existing factory buildings or to the mechanical equipment, and thus it is possible to sufficiently check and consider the interference with the building or other mechanical equipment and the lines of flow of the operators and the material carriers, for example.

As described above, the content display system 1 enables a general-purpose tablet-type terminal or a personal computer to be used as the content display device 10 and the content management device 20, thereby achieving a lower cost of a determination operation on the object using MR technique.

Second Embodiment

Figure 23:
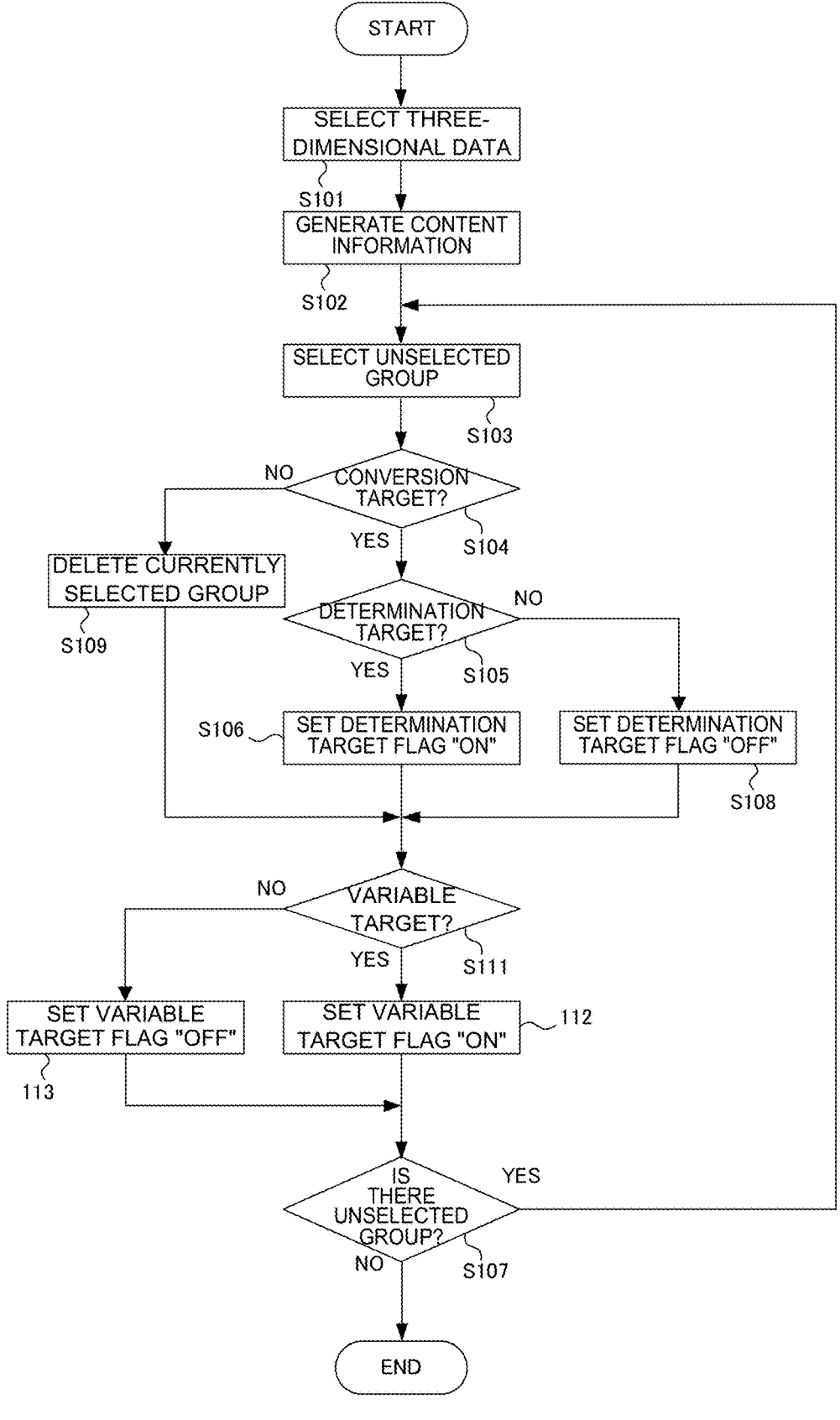
FIG. 23 is a flow chart showing content generation processing according to the second embodiment.
Figure 25:
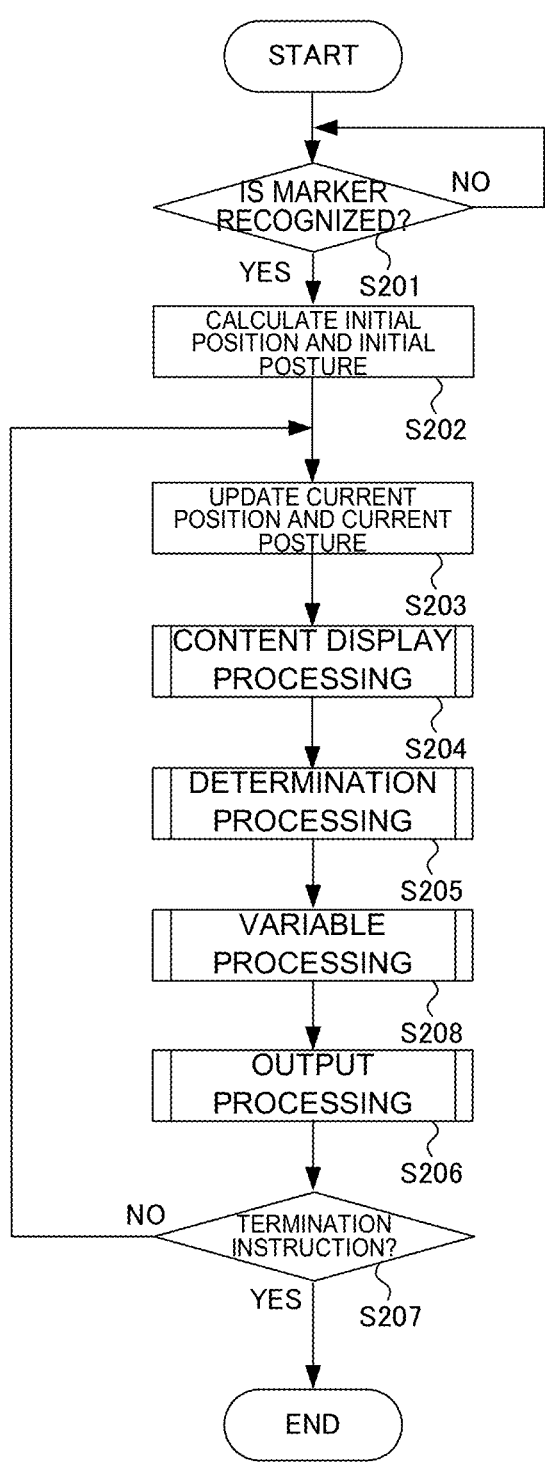
FIG. 25 is a flow chart showing an operation of the content display device according to the second embodiment.
Figure 26:
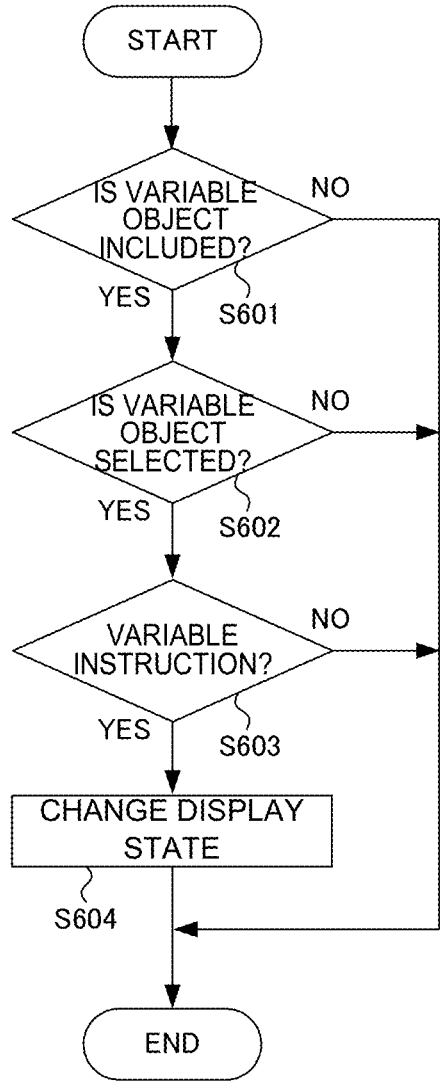
FIG. 26 is a flow chart showing variable processing according to the second embodiment.
Figure 27:
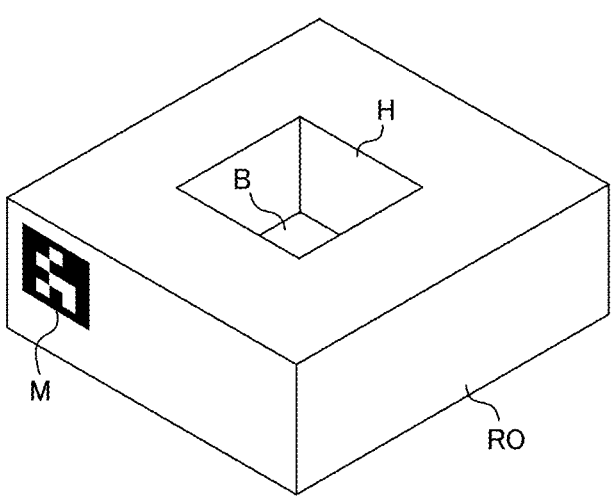
FIG. 27 is a schematic diagram illustrating a real object according to the second embodiment.
Figure 28:
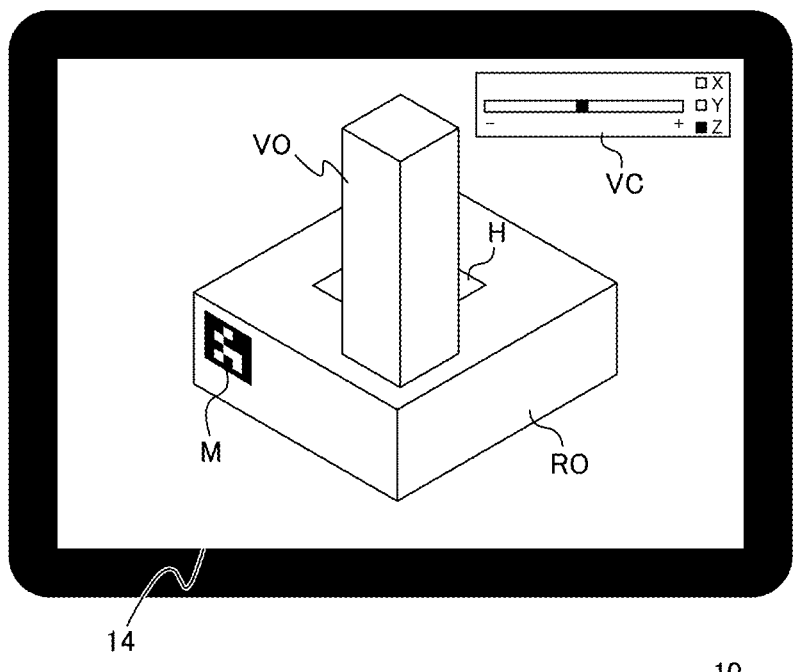
FIG. 28 is a diagram illustrating the content display device that displays a virtual object overlaid on a real object according to the second embodiment.

The content display device according to the second embodiment will be discussed. FIGS. 23, 25, and 26 are flow charts respectively showing content generation processing, operations of the content display device, and variable processing according to the present embodiment. FIG. 24 is a diagram showing object information according to the present embodiment. FIG. 27 is a schematic diagram illustrating a real object according to the present embodiment. FIG. 28 is a diagram illustrating a content display device that displays a virtual object overlaid on a real object according to the present embodiment.

The content display device 10 according to the present embodiment is different from the first embodiment in that a scale of the virtual object overlaid on the real object can be changed for each of three axes (x, y, z, see FIG. 11) of the virtual space. In the present embodiment, a variable object, which is a virtual object capable of extending and contracting the scale, is included in the content.

The content generation processing according to the present embodiment is different from the first embodiment in that S106, S108, and S109 are executed and then S111 is executed as shown in FIG. 23 in order to generate such a variable object. In S111, the converting unit 201 of the content management device 20 determines whether the selected group is set as a variable target.

When the selected group is a variable target (S111, YES), the converting unit 201 sets a variable target flag in object information of each virtual object included in the selected group to "ON" (S112, YES), and executes the processing of S107. On the other hand, when the selected group is not a variable target (S112, NO), the converting unit 201 sets a variable target flag in object information of each virtual object included in the selected group to "OFF", and executes the processing of S107.

As shown in FIG. 24, the object information thus generated according to the present embodiment is different from the first embodiment in that the variable target flag, the x-scale, the y-scale, and the z-scale are further associated with the object ID. The variable target flag indicates whether the corresponding virtual object is a variable target. The x-scale, the y-scale, and the z-scale each have an initial value of 0, and values from a negative value as a minimum value to a positive value as a maximum value are entered. When a negative value is entered, a corresponding virtual object is reduced, and when a positive value is entered, a corresponding virtual object is enlarged. The x-scale indicates a scale of the corresponding virtual object in the x-axis direction. The y-scale indicates a scale of the corresponding virtual object in the y-axis direction. The z-scale indicates a scale of the corresponding virtual object in the z-axis direction. For example, when a negative value is entered in the z-scale, the corresponding virtual object is reduced only in the z-axis direction.

As shown in FIG. 25, the content display device 10 according to the present embodiment is different from the first embodiment in that the variable processing is executed as the processing of the step S208 prior to the outputting processing. As shown in FIG. 26, in the variable processing, the display processing unit 104 determines whether a variable object with the variable target flag being "ON" is included in the content being displayed (S601).

When the variable object is included (S601, YES), the display processing unit 104 determines whether the variable object has been selected by the user (S602), and when the variable object has been selected (S602, YES), determines whether the user has made a variable instruction to change the scale in the axis direction selected from the three axes (S603). When the variable instruction is made (S603, YES), the display processing unit 104 changes the scale of the variable object based on the variable instruction (S604).

When the variable object is not included (S601, NO), when the variable object is not selected (S602, NO), or when the variable instruction is not made (S603, NO), the variable process is terminated.

Figure 29:
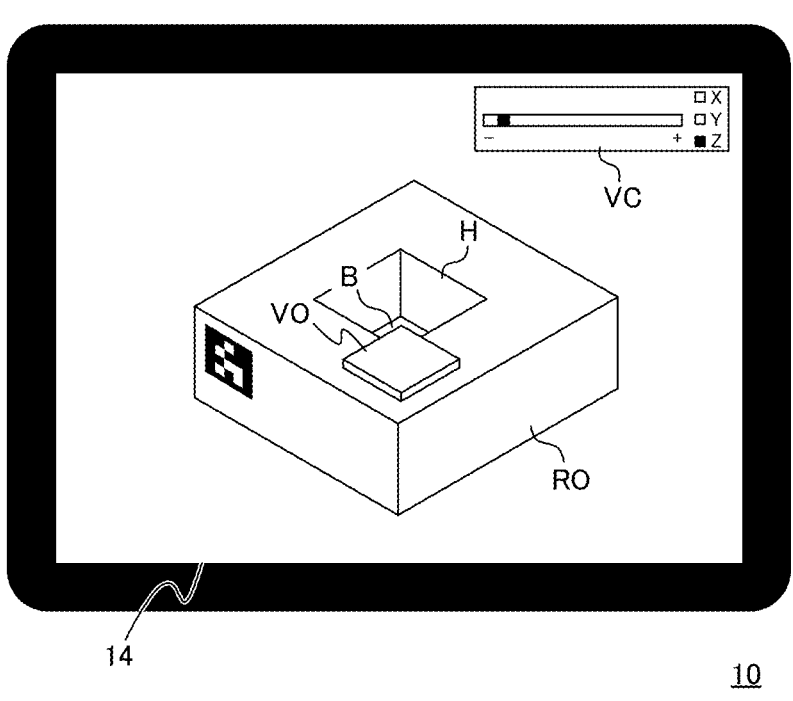
FIG. 29 is a diagram illustrating the content display device that displays a varied virtual object according to the second embodiment.

Referring to FIGS. 27 to 29, a variable object to be reduced in scale will be described as a specific example. In this embodiment, as shown in FIG. 27, a real object RO is formed in a substantially rectangular parallelepiped shape, in which a hole H is formed on the upper surface, and the hole H is a non-through hole having a bottom surface B. As shown in FIG. 28, assume that a columnar variable object VO extending in the z-axis direction is overlaid on the real object RO and displayed. Further, assume that the variable object VO represents a part to be inserted into the hole H.

The variable instruction described above is made using a variable operation unit VC, which is a GUI displayed on the touch panel. The variable operation unit VC includes three checkboxes for selecting axes for varying the scale of the variable object VO and a slider UI capable of manipulating a knob in the left-right direction. When the knob is moved to the left side, the variable object VO is reduced, and when the knob is moved to the right side, the variable object VO is enlarged.

In FIG. 28, the z-axis (up-down direction in FIG. 28) is selected as an axis for changing the scale of the variable object VO, and the knob is located at the center portion, and thus the scale of the variable object VO is not changed. The variable object VO is positioned so as to be fitted into the hole H and covers the bottom surface B of the hole H. As such, the user cannot determine whether the variable object VO interferes with the bottom surface B of the hole H.

As shown in FIG. 29, when the knob of the slider UI in the variable operation unit VC is moved to the left, the variable object VO is reduced in the z-axis direction. This enables both the variable object VO and the bottom surface B of the hole H to be displayed on the touch panel 14, and the user thereby can determine whether the variable object VO interferes with the bottom surface B of the hole H.

When the content display device 10 of the present embodiment is used in the assembly verification of the mold and the press machine as in the third use example described above, the content display device 10 can reduce the scale of the virtual object representing a cushion pin in a recess of the mold having a plurality of recesses in a recessing direction of the recesses. This enables the user to easily check the degree of interference between the bottom of the recess of the mold and the cushion pin.

Third Embodiment

Figure 30:
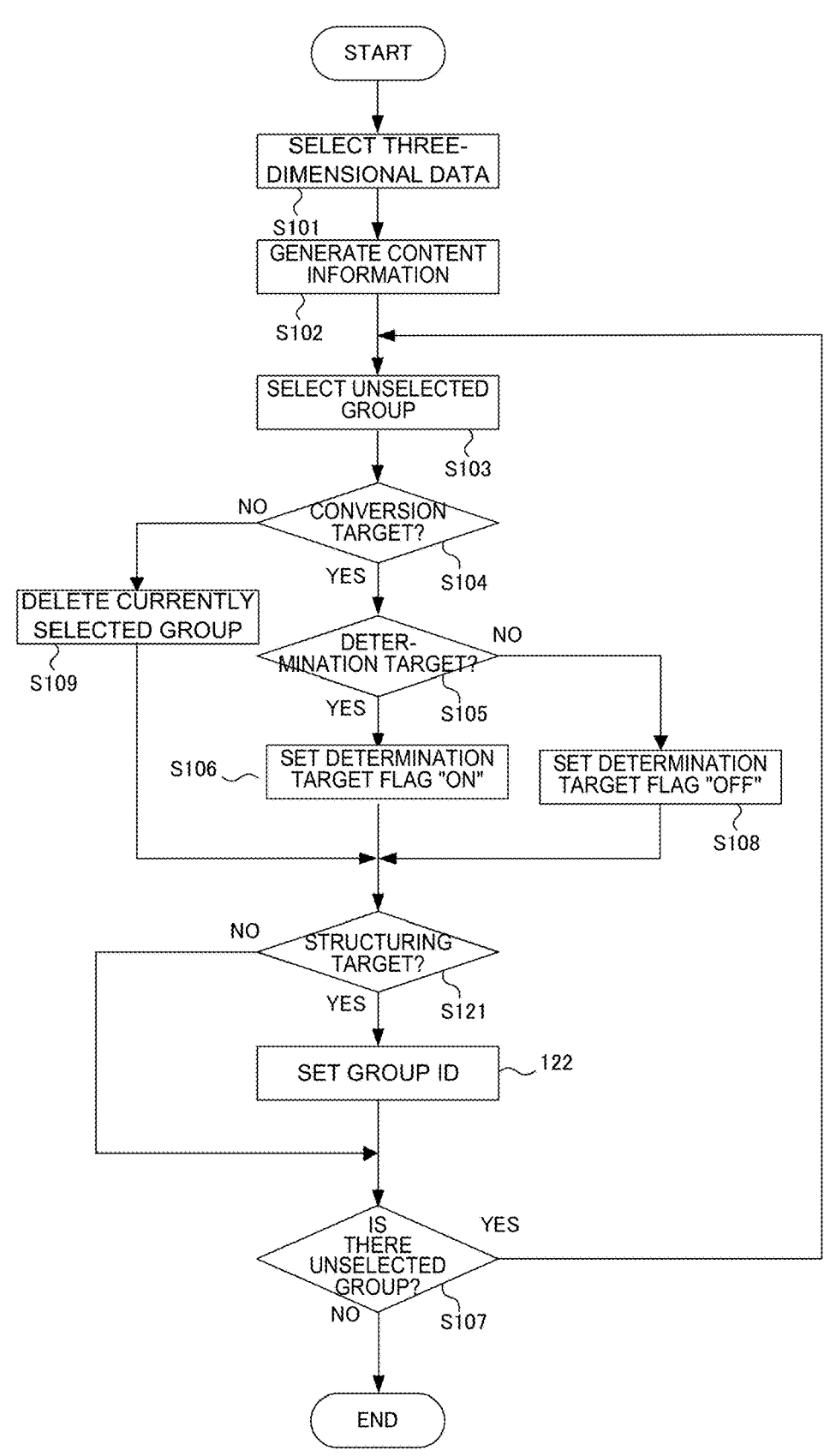
FIG. 30 is a flow chart showing content generation processing according to the second embodiment.
Figure 32:
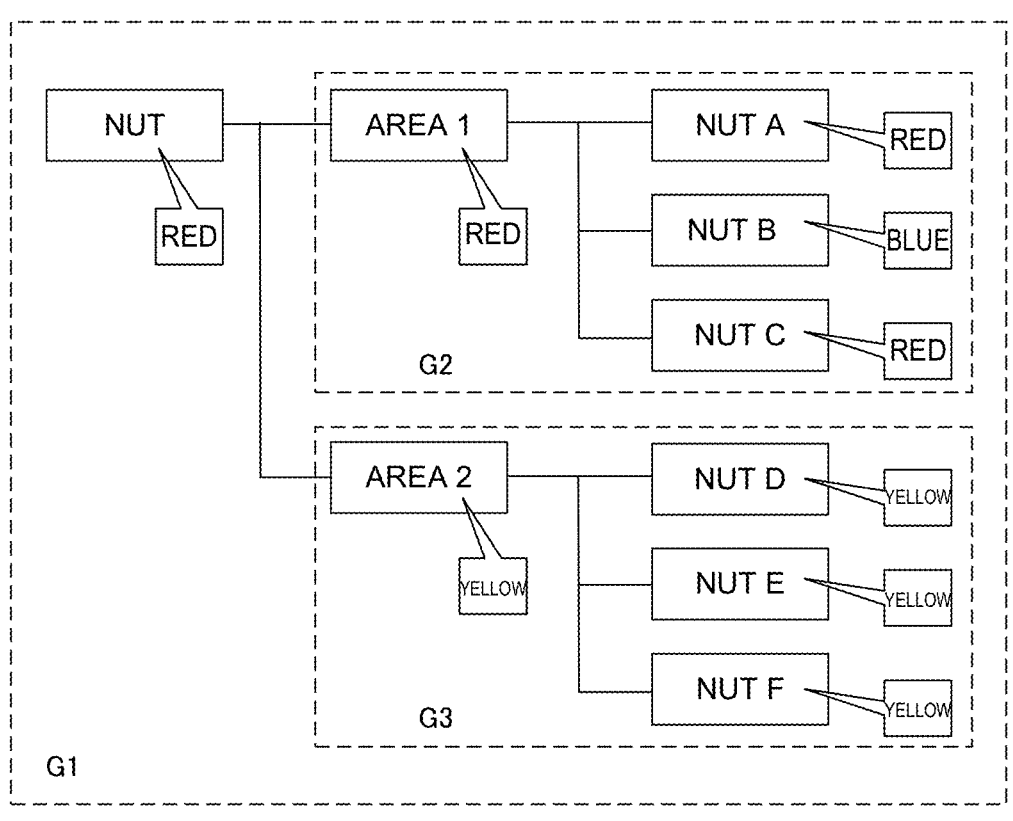
FIG. 32 is a diagram showing a hierarchical virtual object group according to the third embodiment.

The content display device according to the third embodiment will be discussed. FIG. 30 is a flow chart showing content generation processing according to the present embodiment. FIG. 31 is a diagram showing object information according to the present embodiment. FIG. 32 is a diagram showing a hierarchical virtual object group according to the present embodiment.

The content display device 10 according to the present embodiment is different from the first embodiment in that a plurality of virtual objects included in the content can be hierarchized. In the present embodiment, a hierarchical object that is a virtual object associated with a group, to which another group including the virtual object belongs, is included in the content.

The content generation processing according to the present embodiment is different from the first embodiment in that S106, S108, and S109 are executed and then S121 is executed as shown in FIG. 30 in order to generate such a hierarchical object. In S121, the converting unit 201 of the content management device 20 determines whether the selected group is set as a structuring target.

If the selected group is a structuring target (S121, YES), the converting unit 201 associates parent IDs (described later) in object information of each of virtual objects included in the selected group with group ID indicating the group to which the group including such virtual objects belong (S122, YES), and executes the processing of S107. On the other hand, when the selected grouping is not a structuring target (S122, NO), the converting unit 201 does not change the parent ID in the object information and executes the empty step S107. The default value of the parent ID is an empty value or a group ID indicating a route group including all virtual objects in the content. Further, assume that the parent ID is set to a group specified by the user prior to the content generation processing or is set based on the structuring information included in the entered three-dimensional data.

As shown in FIG. 31, the object information thus generated according to the present embodiment is different from the first embodiment in that the parent ID described above is further associated with the object ID. The parent ID is set with a group ID indicating a group to which the group indicated in the corresponding group ID belongs.

As shown in FIG. 32, the object information including such a parental ID can handle the virtual objects in a hierarchical manner. FIG. 32 shows six nuts A to F as virtual objects. G1 is set to a parent ID of object information of each of the six nuts A to F. G2 is set to a group ID of object information of each of the nuts A to C. G3 is set to a group ID of object information of each of the nuts D to F. This enables to represent all of the nuts including three nuts belonging to "area 1" and three nuts belonging to "area 2", which is different from the "area 1." A group belonging to another group may be set as a parent ID, and the virtual objects may be hierarchized in three or more layers.

The virtual objects are structured in this way, which provides more flexibility in making changes to a plurality of virtual objects. For example, when the display colors of the nuts are changed as shown in FIG. 32, the display colors of all the nuts may be changed to red. Subsequently, the display color of only the nut B among the nuts belonging to the "area 1" may be changed to blue, and the display colors of all the nuts belonging to the "area 2" may be changed to yellow. As described above, the structured virtual objects serve to easily make changes to some of the virtual objects belonging to the same group as compared with the case where all the virtual objects are individually changed.

When the content display device 10 according to the present embodiment is used for verifying operation after the coating as the second use example, a large number of coating positions can be classified not only for the coating locations and the coating materials but also for the areas in charge and the persons in charge. This serves to reduce errors in the coating operation. Further, in the content display device 10, the operator hides the coating position where the check has been completed and displays only the position where the check has not been completed, thereby increasing the efficiency of the check.

While certain embodiments have been described, these embodiments have been presented by way of example only, and are not intended to limit the scope of the inventions. Indeed, the novel embodiments described herein may be embodied in a variety of other forms. Furthermore, various omissions, substitutions, and changes in the form of the embodiments described herein may be made without departing from the spirit of the inventions. The accompanying claims and their equivalents are intended to cover such forms or modifications as would fall within the scope and spirit of the disclosure.

What is claimed is:

1. A content display device that displays content including at least one or more virtual objects, comprising:
   a parameter calculating unit that calculates an initial position and an initial posture of the content display device as initial parameters based on a captured image of a real object with a position of the real object as an origin;
   a parameter updating unit that calculates displacement of a position and a posture of the content display device and updates the position and the posture of the content display device starting from the initial position and the initial posture;
   a display processing unit that overlays and displays the content on the real object, the content being disposed in a virtual space with the position of the real object as an origin; and
   a determination processing unit that changes, when a virtual object included in the displayed content is selected and operated, a determination state of the virtual object,
   wherein the determination state of the virtual object includes at least a normal state and an abnormal state, and
further comprising an output processing unit that outputs determination result information about a virtual object that is determined to be abnormal,
wherein
the determination result information associates an object ID, which is an identifier indicating the virtual object determined to be abnormal, with a user ID, which indicates a user who has changed the determination state.

2. The content display device according to claim 1, wherein
   the determination processing unit changes the determination state of the virtual object according to a number of selection operations of the virtual object.

3. The content display device according to claim 1, wherein
   the determination result information further associates the object ID with a date and time at which the determination state is changed.

4. The content display device according to claim 1, wherein
   the determination result information further associates the object ID with text corresponding to a virtual object indicated by the object ID.

5. The content display device according to claim 1, wherein
   the determination result information further associates the object ID with a media file.

6. The content display device according to claim 1, wherein
   in response to an instruction operation of the user, the parameter calculating unit calculates the initial position and the initial posture of the content display device based on the captured image of the real object.

7. The content display device according claim 1, wherein
   the parameter calculating unit calculates the initial position and the initial posture of the content display device based on the captured image of the real object at each predetermined cycle.

8. The content display device according claim 1, wherein
   the parameter calculating unit calculates the initial position and the initial posture of the content display device based on the captured image of the real object each time a characteristic part of the real object is captured.

9. The content display device according to claim 1, wherein
   the display processing unit displays a pin object, which is a pin-shaped virtual object indicating a position specified in the virtual space by the user.

10. The content display device according to claim 9, wherein
    the pin object is associated with additional information, which includes at least one of text or a media file, and
    in a case where the pin object is selected, the display processing unit displays the additional information associated with the pin object.

11. The content display device according to claim 1, wherein
    the display processing unit extends and contracts a scale of the virtual object selected based on an instruction of the user in a direction selected from three axis directions in the virtual space.

12. The content display device according to claim 1, wherein the virtual object is associated with a group ID that indicates a group to which the virtual object belongs and a parent ID that indicates another group to which the group indicated by such a group ID belongs.

13. A non-transitory computer readable medium including a content display program that displays content including at least one or more virtual objects, the content display program causing a computer to function as:

a parameter calculating unit that calculates an initial position and an initial posture of a device as initial parameters based on a captured image of a real object with a position of the real object as an origin;

a parameter updating unit that calculates displacement of a position and a posture of the device and updates the position and the posture of the device starting from the initial position and the initial posture;

a display processing unit that overlays and displays the content on the real object, the content being disposed in a virtual space with the position of the real object as an origin; and a determination processing unit that changes, when a virtual object included in the displayed content is selected and operated, a determination state of the virtual object, wherein the determination state of the virtual object includes at least a normal state and an abnormal state, and further to function as an output processing unit that outputs determination result information about a virtual object that is determined to be abnormal, wherein the determination result information associates an object ID, which is an identifier indicating the virtual object determined to be abnormal, with a user ID, which indicates a user who has changed the determination state.

14. A content display method that displays content including at least one or more virtual objects, wherein a computer:

calculates an initial position and an initial posture of a device as initial parameters based on a captured image of a real object with a position of the real object as an origin;

calculates displacement of a position and a posture of the device and updates the position and the posture of the device starting from the initial position and the initial posture;

overlays and displays the content on the real object, the content being disposed in a virtual space with the position of the real object as an origin; and changes, when a virtual object included in the displayed content is selected and operated, a determination state of the virtual object, wherein the determination state of the virtual object includes at least a normal state and an abnormal state, and further the computer outputs determination result information about a virtual object that is determined to be abnormal, wherein the determination result information associates an object ID, which is an identifier indicating the virtual object determined to be abnormal, with a user ID, which indicates a user who has changed the determination state.

15. A content display system comprising:

a content display device that displays content including at least one or more virtual objects; and a content management device communicatively coupled to the content display device, wherein the content management device includes:

a converting unit that converts entered three-dimensional data into content information including the three-dimensional data and a content ID, which is an identifier uniquely indicating the three-dimensional data, and a content transmitting unit that transmits the converted content information to the content display device, the content display device includes:

a parameter calculating unit that calculates an initial position and an initial posture of the content display device as initial parameters based on a captured image of a real object with a position of the real object as an origin;

a parameter updating unit that calculates displacement of a position and a posture of the content display device and updates the position and the posture of the content display device starting from the initial position and the initial posture;

a content receiving unit that receives the content information transmitted from the content management device;

a display processing unit that overlays and displays the content on the real object based on the received content information, the content being disposed in a virtual space with the position of the real object as an origin; and a determination processing unit that changes, when a virtual object included in the displayed content is selected and operated, a determination state of the virtual object, wherein the determination state of the virtual object includes at least a normal state and an abnormal state, and further comprising an output processing unit that outputs determination result information about a virtual object that is determined to be abnormal, wherein the determination result information associates an object ID, which is an identifier indicating the virtual object determined to be abnormal, with a user ID, which indicates a user who has changed the determination state.

16. A content display method executed by:

a content display device that displays content including at least one or more virtual objects; and a content management device communicatively coupled to the content display device, wherein the content management device:

converts entered three-dimensional data into content information including the three-dimensional data and a content ID, which is an identifier uniquely indicating the three-dimensional data, and transmits the converted content information to the content display device, the content display device:

calculates an initial position and an initial posture of the content display device as initial parameters based on a captured image of a real object with a position of the real object as an origin;

calculates displacement of a position and a posture of the content display device and updates the position and the posture of the content display device starting from the initial position and the initial posture;

receives the content information transmitted from the content management device;

overlays and displays the content on the real object based on the received content information, the content being disposed in a virtual space with the position of the real object as an origin; and changes, when a virtual object included in the displayed content is selected and operated, a determination state of the virtual object, wherein the determination state of the virtual object includes at least a normal state and an abnormal state, and further comprising an outputting determination result information about a virtual object that is determined to be abnormal, wherein the determination result information associates an object ID, which is an identifier indicating the virtual object determined to be abnormal, with a user ID, which indicates a user who has changed the determination state.

* * * * *